Aug. 22, 1967     D. A. STARK     3,336,891

AUTOMATIC PILOT SYSTEM FOR DIRIGIBLE VEHICLES

Filed June 17, 1965     2 Sheets-Sheet 1

INVENTOR.
Donald A. Stark,
BY John N. Leonards
his ATTORNEY.

Aug. 22, 1967  D. A. STARK  3,336,891
AUTOMATIC PILOT SYSTEM FOR DIRIGIBLE VEHICLES
Filed June 17, 1965  2 Sheets-Sheet 2
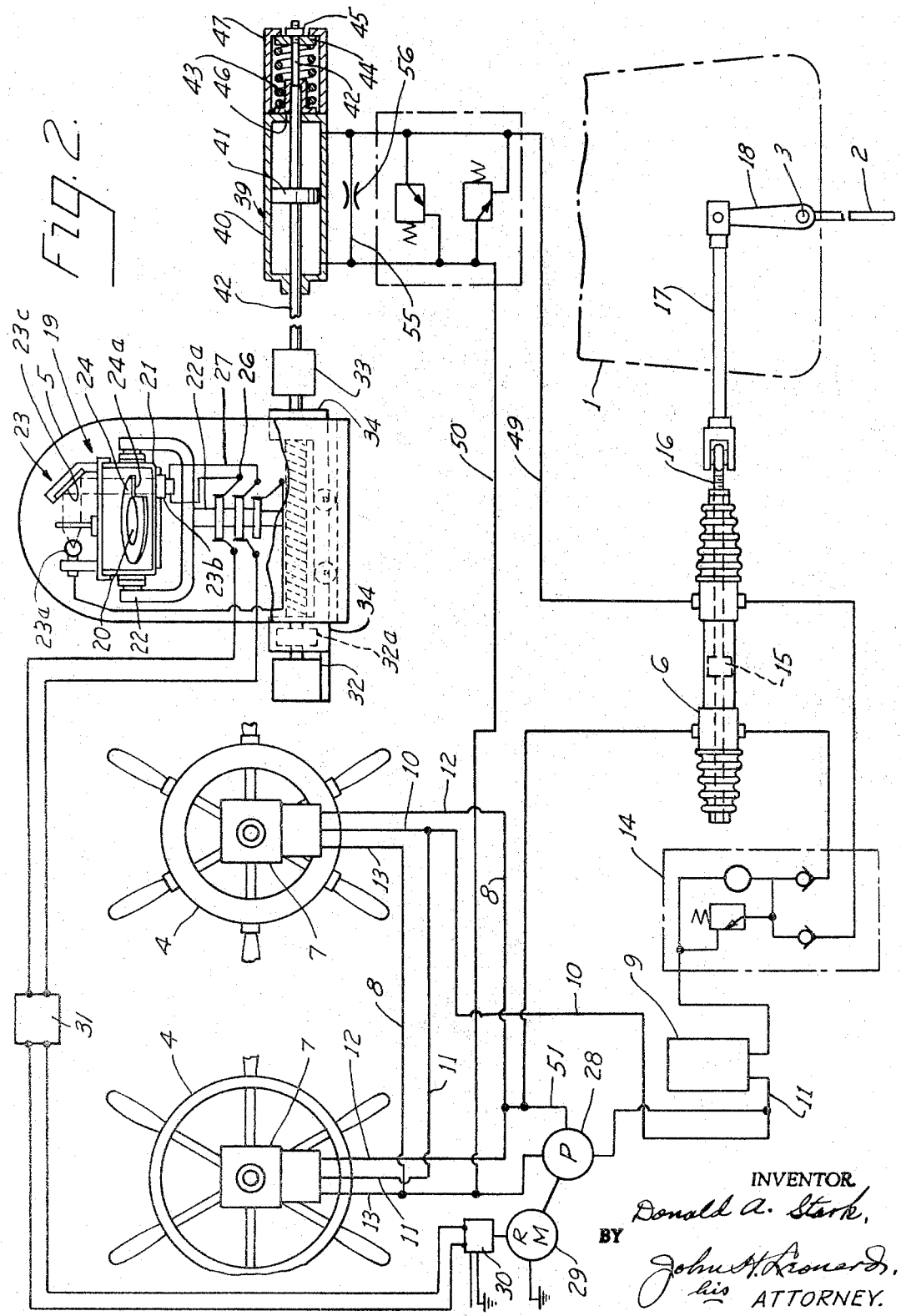

United States Patent Office 3,336,891
Patented Aug. 22, 1967

3,336,891
AUTOMATIC PILOT SYSTEM FOR DIRIGIBLE VEHICLES
Donald A. Stark, Painesville, Ohio, assignor to Fluid Controls, Inc., Mentor, Ohio, a corporation of Ohio
Filed June 17, 1965, Ser. No. 464,663
12 Claims. (Cl. 114—144)

This invention relates to an autopilot system for dirigible vehicles having power actuated by steering means for controlling the direction of travel of the vehicle.

For purposes of illustration, this system is described herein as applied to a boat having a power actuated underwater rudder, its use in connection with fan propelled boats and air vehicles having air engaged rudders and other types of steering devices being readily apparent from the illustrative example.

Generally, boat rudders are driven by suitable power means which are reversible for deflecting the rudder to the right or to the left of the fore and aft median line of the boat. Instead of controlling the power means by hand to bring the boat onto course, and to hold it on course against the deflecting forces imposed by wind, tides, waves and the like, a conventional autopilot is provided.

The conventional autopilot is installed in a binnacle unit which accommodates a compass bowl with a north-seeking member of the magnetic or gyroscopic type therein. The member carries a light intercepting shutter.

The bowl carries a light and light sensitive cell which are mounted in fixed position relative to the bowl so that a beam of light is directed onto the cell. The signal produced in response to the beam of light is passed to a control for the power steering means of the boat. So long as the shutter bisects the beam of light, no signal is produced. When the boat moves off course, the shutter moves to right or left of the bisecting position. This produces a signal of which the intensity varies with the degree of light permitted to fall on the cell. The control is responsive to the signal intensity and is operative to cause reversal of the power supplied to the steering motor as the shutter moves to right and left of its beam bisecting position, respectively.

The bowl is mounted in the binnacle unit for rotation about an upright axis relative to the boat for changing course.

A feed-back system is provided for driving the compass bowl in relation to changes in rudder position to reduce oversteering and hunting.

Generally, in this prior system, the power means for steering include a reversible electric motor responsive to the control which is operated by the signals from the autopilot in such a manner that the adjustment of the rudder is always in relation to a fixed normal reference position which is in the fore and aft median line of the boat.

Such prior pilot systems can steer a boat with reasonable accuracy providing current, wind, wave and such factors remain relatively stable. However, frequently these factors vary considerably and change rapidly and continually relative to any selected norm and relative to each other. Under such changing conditions, the conventional autopilot tends to oversteer and understeer frequently and then to under-compensate or over-compensate for errors which it itself introduced. This appears to be due to the inability of the autopilot to respond properly, because of the inherent defect built into it based on the mistaken theory that each deviation from course must be compensated for by resetting the rudder in relation to the above described normal reference position on the median line.

The present system is free from the defects in these prior systems. Instead of adjusting the rudder relative to a fixed normal reference position along the fore and aft median line of the boat, the present system adjusts the rudder at each adjusting operation from a floating or migratory reference position. This floating or migratory reference position is directly related to those rudder positions which existed for a short interval immediately preceding the adjustment currently being made, and is most pronouncedly related to the adjustment immediately preceding the one being made. The adjustments are individual and in succession, but successive ones differ from each other by such small increments and decrements and succeed each other with such rapidity that they tend to provide a continually floating or migratory rudder position wherein the successive positions continuously merge into each other and lose any readily observable identity and resulting boat response.

This is particularly true as to boat response because of the natural damping of the boat movement by the forces of the fluid media of water and air to which the boat is subjected while in operation.

For example, disregarding for the time being the substantially continual variations in rudder adjustment and considering each adjustment of position as an individual one, when the boat, traveling on course with its rudder in a normal reference position on the median line of the boat, starts to deviate, the autopilot immediately causes the rudder to be deflected in relation to the normal reference position and the boat starts to return to course. If, at this time, the extraneous factors change and cause a different deviation, the autopilot no longer deflects the rudder in relation to the original and fixed normal reference position, but from the current position that existed the instant the additional deviation occurred. Such current position is established and used as a new reference even though the boat has not fully responded thereto. This resetting of the rudder, therefore, is from a floating or migrating reference position, and if, before the current adjustment, a number of resettings occur in rapid succession and before the boat has fully responded to each in turn, the current adjustment approaches a setting relative to the average of the few immediately preceding settings.

This manner of functioning is accomplished, broadly speaking, by combining with a conventional feed-back autopilot system, auxiliary restoring means which are operative independently of the positions to which the reversible power steering means has moved the rudder in response to a given pilot signal. The restoring means operate to restore the shutter to its original manually set position for course relative to the boat, while the rudder remains in the position to which it had been moved in response to the preceding motivating signal. Thus the next adjustment for deviation is from the current floating position of the rudder.

Various specific objects and advantages will become apparent from the following description wherein reference is made to the drawings in which:

FIG. 2 is an illustration of a hydraulic steering system of a conventional type, with the autopilot device of the present invention installed therein;

Figure 1:
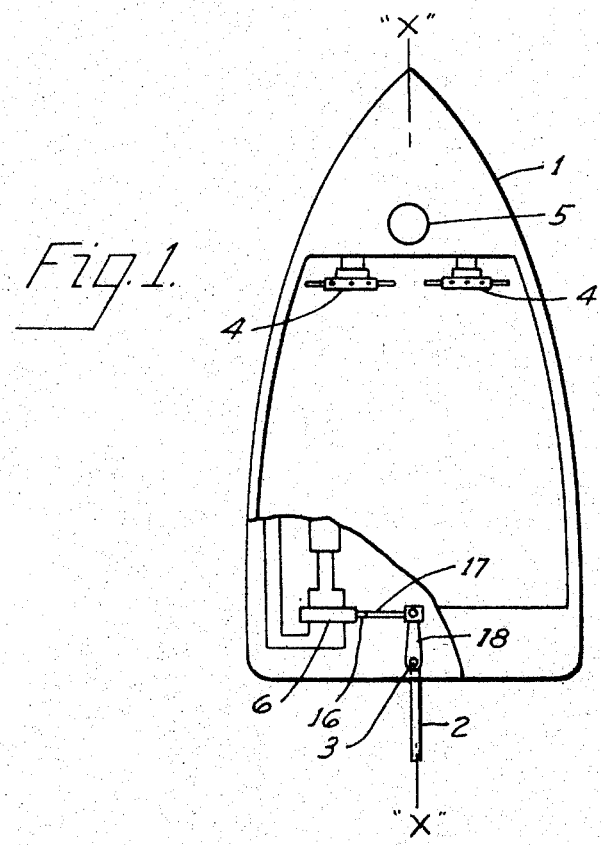
FIG. 1 is a diagrammatic illustration of a boat with the autopilot device of the present invention installed therein.
Figure 3:
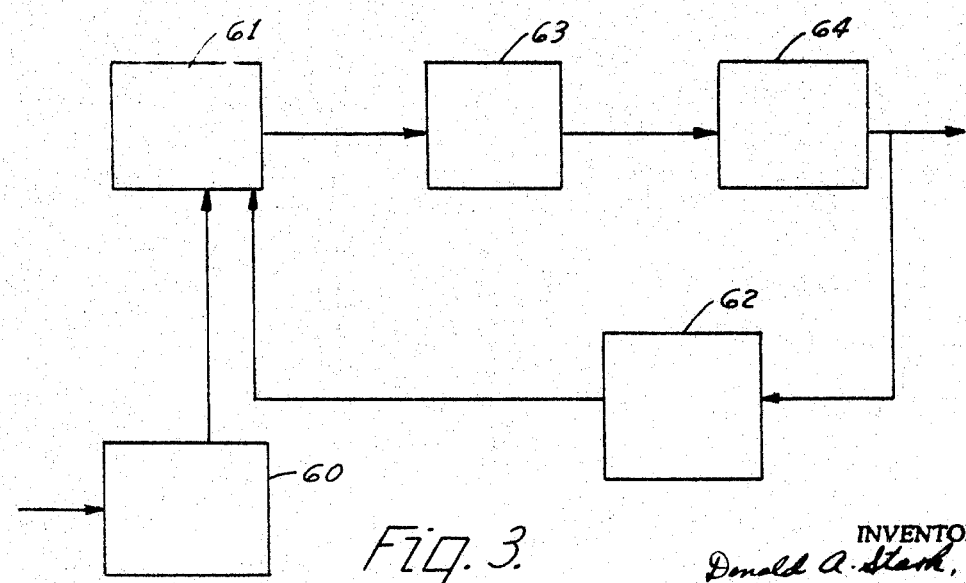
FIG. 3 is a block diagram of an electrical type of an autopilot embodying the present invention and combined with an electric steering system.

Referring to FIGS. 1 through 3, the invention, as mentioned, is shown as installed in a boat 1 having the usual rudder 2 submerged in the water for steering purposes. The rudder 2 is mounted on the boat to swing about the axis of a pivot 3. The boat may be steered by either of two pilot wheels 4 which are connected for concurrent operation. The boat is provided with conventional binnacle 5 enclosing a magnetic compass and the cooperating signal producing parts of the autopilot.

For purposes of illustration, the rudder is shown as driven by a double acting piston and cylinder assemblage 6 in response to operation of the pilot wheels 4. For example, the pilot wheels 4 drive hydraulic steering assemblies 7 which are connected in parallel with each other by two pipe lines 8. A supply of fluid from a make-up reservoir 9 is connected to the assemblies 7 by make-up pipe lines 10 and 11 so that the system is fully filled with fluid at all times. Each of the assemblies 7 is connected by a pipe line 12 to one end of the double acting piston and cylinder assemblage 6, one connection being by way of a feedback piston and cylinder assemblage, later to be described. Each assembly 7 is connected by a pipe line 13 through the intermediary of line 15 and the assemblage 39, later to be described, to the opposite end of the cylinder assemblage 6. The assemblies 7 are such that when pilot wheel 4 is rotated in one direction the fluid is supplied to one end of the assemblage 6 and vented from the other end. Upon reverse rotation of the pilot wheels, the fluid is supplied to said other end and vented from said one end. A settable relief valve assembly 14 is interposed between the assemblage 6 and reservoir 9 so as to relieve any undue fluid pressures that might otherwise be developed due to bottoming of the piston and cylinder assemblage 6 accompanied by continued rotation of the pilot wheels 4. The assemblage 6 has a piston 15 with a piston rod 16 which is connected by a suitable link 17 to a tiller or operating arm 18 of the rudder 2. The structure thus described is conventional and readily available on the market.

The prior feed-back systems interconnecting an autopilot signal producing means and the power steering means on a boat are of a type operative to set the rudder, for correcting deviations in course indicated by the autopilot, from a normal fixed reference position of the rudder which is one in which the rudder is parallel to the longitudinal median line x—x of the boat.

In accordance with the present invention, an automatic pilot of the general type heretofore used is employed, but is combined with an auxiliary restoring means which modifies its operation so that it corrects for deviations in course by continually resetting the rudder from a floating reference position.

Referring to FIG. 2, a conventional autopilot 19 is shown for illustration and comprises a north-seeking compass member 20 of the magnetic or gyroscopic type and a compass bowl 21 supported in a binnacle yoke 22. The yoke is mounted in the binnacle on a column 22a which can be rotated about an upright axis to different adjusted positions relative to the boat. Signal producing means 23 are provided and comprise a light 23a and a light sensitive cell 23b and a mirror 23c, all mounted in fixed position on the bowl 21 so that a beam of light passes from the light to the cell. A shutter 24 is mounted in fixed position on the compass member 20. The shutter 24 has a notch 24a which, in the set on-course position of the pilot, bisects the beam of light if the boat is on its selected course. The light sensitive cell has terminals 26 and 27 and is so arranged that the voltage across the terminals varies in intensity in relation to the amount of light striking the cell 23b.

If desired, other types of shutters and devices may be used, such as the spiral groove type of shutter wherein the strength of the current is proportional to the movement of the shutter from its normal on-course position.

When the automatic pilot system is to be used, a suitable reversible power supply means for driving the rudder is provided. The supply means is shown as a reversible delivery pump 28 which may be rotated in opposite directions, respectively, by a reversible electric motor 29. The motor 29 is controlled as to direction of rotation by a suitable control 30 which is connected to the terminals 26 and 27 so as to operate in opposite directions, depending on the intensity of current flow from the terminals 26 and 27. The control 30 and cell 23b are so related that, when the boat is on course and the shutter is in neutral position in which it bisects the light beam, the control disconnects the motor 29 from its power source. When the shutter moves clockwise out of its neutral position a predetermined amount it causes the control to connect the motor 29 to its power source for rotation of the motor in one direction. When the shutter moves counterclockwise out of its neutral position a predetermined amount it causes the control 30 to connect the motor 29 to its power source so that the rotation of the motor is reversed. The pump 28 is connected to the line 11 in a known manner so that leakage of pressure fluid from the hydraulic circuit is replaced continuously from the reservoir 9. Thus the direction of movement of the rudder 2 is determined by the direction of drive of the motor 29, and the direction of drive of the motor 29 is controlled by the direction of deviation of the shutter notch 24a from its position bisecting the light beam, and hence, the direction of deviation of the boat from on-course position.

In such an automatic pilot, it is necessary that the notch 24a bisect the light beam in on-course position regardless of the course selected. For this purpose, the column 22a of the yoke 22, and thereby the bowl 21 can be rotated relative to the boat by a suitable manually controlled change course motor 32 through a transmission 32a. This transmission becomes inoperative to interfere with rotation of the bowl when the motor 32 is not being operated to change the course setting.

As mentioned, a feed-back device is provided for feeding back signals dependent on rudder position. The signals, in the form illustrated in FIG. 2, are hydraulic-mechanical signals and generally are applied to a translating device 33 which includes carriage 34 and which causes rotation of the bowl 22, relative to the boat or vehicle, to different operating positions dependent upon movement of the carriage, which movement in turn is dependent upon the feed-back signal. This feed-back device is desirable for reducing hunting and oversteering. Such feed-back and translating devices are well known in all pilots employing feed-backs. An example of such a translating device is one marketed by The Bendix Corporation, Marine Division, Santa Ana, Calif., as Model 16–a, Automatic Hynautic Steering System.

The electrical circuit includes the usual amplifier 31 for amplifying the signals received from the light sensitive cell 23b.

The translating device 33 is well known in all pilots employing feedbacks.

With the structure thus far described, all settings of the rudder for boat deviation from course are made with reference to a fixed reference rudder position in which the rudder is parallel to the fore and aft median line x—x of the boat.

In accordance with the present invention, each setting of the rudder is with reference to a currently existing floating or migrating position of the rudder as it existed immediately prior to the new setting. If the changes in extraneous forces influencing the boat are varying rapidly, this floating position currently approaches a setting relative to the average of the few immediately preceding rudder positions.

For this purpose, a feed-back device which is self-restoring to a fixed neutral starting position is provided. This device comprises a double action piston and cylinder assemblage 39 having a cylinder 40 in which is a double end piston 41 having a rod 42. One end of the rod 42 drives the translating device 33 which, translates the mechanical signal in the form of linear motions of the piston 41 into rotary motion for rotating the bowl 21. The piston 41 is biased to a centered or neutral position between the ends of the cylinder 40 by resilient means such as a spring 43. For rendering the biasing-force of the spring effective in both directions of piston movement, a suitable abutment washer 44 is slidably mounted on one end of the rod 42 and is limited in its movement away from the cylinder 40 by a suitable head 45. A cap 46 is slidably mounted on the same end of the rod 42 in spaced relation to the head 45 for movement with the rod in a direction away from the cylinder as the piston 41 moves to the right, in FIG. 3, out of its centered position and for movement relative to the associated rod 42 as the piston 41 moves to the left, in FIG. 3, out of its centered position. A bracket 47 is secured to the cylinder 40 and has its outer ends arranged to be engaged by the washer 44 when the piston is in, or moves to the right from, its centered position in FIG. 2.

In the centered position of the piston, the cap 46 bears against the adjacent end of the cylinder 40. The spring is interposed between the cap 46 and the washer 44. Thus, if the piston is moved to the left, the spring 43 is compressed by the washer 44 and head 45 against the cap 46 which is seated against the cylinder 40. On the other hand, if the piston is moved to the right in FIG. 2, the washer 44 is stopped by the bracket 47, and the cap 46 is moved by the rod 42 to compress the spring 43. In either direction of movement of the piston 41 from its centered position, it is biased toward its centered or neutral position.

The other end of the piston rod 42 operating through the device 33 moves the carriage 34 in fixed relation to the movement of the piston. A pipeline 49, as in the prior art, connects one end of the cylinder of the assemblage 6 to one end of the cylinder 40 and another pipeline 50 connects the opposite end of the cylinder 40 to a pipeline 13 which leads to the pump 28. A pipeline 51 leads from the pump 28 to the portion of the pipeline 12 which is connected to the opposite end of the cylinder of the assemblage 6. Thus, the two cylinders are connected in series with each other and with the pump 28.

The feed-back thus far described, except for the biasing spring 43, is such that when the position of the rudder changes, the compass bowl 21 is moved to a new position wherein the beam of light from the light 23a to the cell 23b will be bisected when the boat rudder reaches it newly set position. However, with such prior devices this setting for bisection of the beam is maintained in fixed relation to the rudder setting at all times, and hence, the rudder position is adjusted in fixed relation to the fixed normal reference position.

As mentioned, in accordance with the present invention, the adjustment for the rudder is not to be made from a fixed normal reference position in the fore and aft median line of the boat. Instead, the adjustment is to be made each time from a floating or migrating reference position, predominantly the position currently existing immediately prior to the adjustment in process. Accordingly, the feed-back is rendered self-restoring to a starting or neutral position by a by-pass circuit which connects the opposite ends of the cylinder 40 to each other so that pressure fluid can flow from one side of the piston 41 to the other as the piston 41 is being returned to its normal centered position by the spring 43.

To provide for this by-passing of the pressure fluid while assuring operation of the piston 41 in response to movement of the piston 15, a by-pass circuit comprising a pipeline 55 and a throttling means, such as the throttling orifice 56 is provided. The pipeline 55 connects opposite ends of the cylinder 40 together through the orifice 56. The orifice 56 may be controlled by a suitable needle valve, although precise adjustment usually is not necessary. The orifice 56 may be small enough so that it restrains the passage of fluid through the by-pass circuit to such an extent that the operation of the piston 41 in response to the movement of the piston 15 is substantially instantaneous with, and equal to, the movement of the piston 15, and so that several seconds elapse between the return of the piston 41 to its centered position by the spring 43. This affords the boat an opportunity to respond to the new rudder setting while the shutter 24 is being returned to its selected course position relative to the boat by the return of the piston 41 toward centered position. This time delay in the return of the piston 41 permits the shutter to reassume its originally set on-course position while the rudder remains in the new position to which it has been moved.

In operation, assuming a deviation from course, the bowl 21 moves to the right or left of the shutter beam-bisecting position, depending upon the direction of deviation from course. This produces a signal which causes the control 30 to energize the motor 29 and the pump 28 to supply pressure fluid to the proper end of the assemblage 6 to move the piston 15 to set the rudder to counteract the deviation from course. Due to the series connection between the assemblages 6 and 39, the piston 41 is likewise moved out of neutral or central position and thereby moves the bowl 21 to a new and temporary position relative to the boat wherein the shutter 24 again bisects the light beam and stops the motor 29. However, with the bowl 21 set in this new and temporary position, the rudder 2 is held by the piston 15 in the new position into which it has currently been moved. Meanwhile the boat is responding to the new rudder position. While the boat is responding, the piston 41 is being returned gradually to its original centered position by the spring 43 and is restoring the bowl 21 to its original on-course position relative to the boat while the rudder 2 remains fixed in its new set position. Thus the relation of the angle of the rudder to the on-course position of the pilot have been changed with respect to each other.

Assuming there is no change in wind, tide, and the like, the rudder may bring the boat onto course or may under or over compensate. If so, the pilot repeats its operations with progressively less increments of change between successive settings of the rudder. On the other hand, as is more usual, conditions of the wind, tide, waves, and the like may change while the boat is seeking course. It is then that the self-restoring feature becomes particularly important. If the boat does not return to course within a few seconds, by which time the bowl 21 has been restored to its original on-course position relative to the boat by the returning piston 41, the pilot again senses deviation from course and again signals for rudder setting, seeking always the proper setting for on-course with reference to the floating or migratory position of the rudder, not from the fixed normal reference position. Generally, the changes in rudder setting occur in such small increments and in such close succession that the rudder is continually migrating from one position to another, so that its reference position at any time approaches an average of the positions called for during a short interval preceding the current setting, the signals and responses being, in effect, stored temporarily and gradually fed out by the delayed self-restoring action of the feed-back device.

The "average position" is not subject to exact mathematical definition, but is directly related to the average of the rudder positions times the interval immediately preceding a setting during which the rudder is in each of the positions averaged. The interval on which the average is based is several times the interval required for the boat to respond to the rudder changes. As mentioned, the rudder positions averaged have more weight as they are nearer in time to the current position.

The size of the orifice 56 affects this phenomenon, the amplitude of hunting by the boat increasing as the orifice is increased.

Thus the recorder is continuously adjusted from a floating reference position in accordance with the average of several positions immediately preceding the adjustment in progress.

Having thus described my invention, I claim:
1. An autopilot system for a dirigible vehicle steered by a rudder,
an autopilot having a north-seeking member and a settable course member settable in different set positions relative to the vehicle and movable in fixed relation to the vehicle in its set positions,
signal producing means operative in response to the relative positions of the members to produce signals reflecting on course and the direction of deviation from course, respectively,
reversible power steering means operative in response to the deviation signals to move the rudder to positions to steer the vehicle back toward course,
feed-back means operative in predetermined relation to the movement of the rudder by the power means to move the settable member from its set position to temporary positions, different from said set position, relative to the vehicle,
and restoring means capable of restoring the settable member to its said set position independently of the temporary position to which the rudder has been moved, while the rudder remains in said temporary position, and operative to continually urge the settable member to said set position independently of the movements of the rudder.

2. A structure according to claim 1 wherein the feed-back means is operative to move the settable means from its set position almost instantly in relation to movement of the rudder, and
the restoring means is operative to move the settable means less rapidly toward said set position.

3. A structure according to claim 1 wherein the feed-back means includes a movable part which is normally in a neutral position and is operatively connected to the settable means and to the reversible power steering means so as to be moved immediately from said neutral position in relation to and in response to the movement of the reversible power steering means to its said different temporary positions for thereby resetting said settable means relative to the vehicle,
and the restoring means is operative to restore said part to said neutral position at a rate of speed less than the speed of movement of said part from its said neutral position.

4. In an autopilot system for a dirigible vehicle having a rudder, a north-seeking compass member, a settable member settable in different positions relative to the vehicle for movement therewith relative to the compass member,
complementary signal producing means on the members operative to produce signals reflecting on-course and the directions of deviation of the members from on-course position,
a double acting power cylinder, a steering piston therein arranged to be connected to the rudder for driving the rudder in opposite directions and to be driven by pressure fluid supplied to the cylinder,
a double acting feed-back cylinder, a restoring piston therein and normally in a neutral position and drivingly connected to the settable member and driven, by pressure fluid supplied to the feed-back cylinder, out of neutral position,
resilient means biasing the restoring piston to said neutral position,
means for setting the settable member in an original on-course position in which the restoring piston is in said neutral position,
a hydraulic pressure circuit connecting opposite ends of the power cylinder to opposite ends of the feed-back cylinder, respectively,
reversible pressure fluid supply means connected in said circuit in series with the cylinders and operable to supply pressure fluid thereto in opposite directions, respectively, and to stop said supply,
a continuously open by-pass circuit interconnecting the opposite ends of the feed-back cylinder,
means responsive to said deviation signals for causing actuation of the supply means to supply pressure fluid in opposite directions, respectively, to the cylinders, as indicated by said deviation signals, thereby moving the restoring piston, against the force of the resilient means, out of said neutral position, and to stop the supply upon an on-course signal,
a throttling orifice in the by-pass circuit in series with said ends of the feed-back cylinder for by-passing fluid at a throttled rate of flow from one side of the restoring piston to the other and thereby effecting movement of the restoring piston by the resilient means to said neutral position and concurrently restoring the settable member to its originally set on-course position when the reversible pressure fluid supply means is stopped.

5. In an autopilot system for a rudder steered vehicle;
autopilot means for producing primary signals reflecting on-course and deviation from course;
reversible power means rendered operative in response to signals reflecting deviation from course for driving the rudder to predetermined positions for returning the vehicle toward course and rendered operative in response to on-course signals for holding the rudder in the position to which moved in response to the preceding deviation signal;
fluid pressure operated feed-back means including a body with a cavity therein, a fluid pressure operated member in the body cavity and subjected to pressure fluid therein at its opposite sides and having a predetermined neutral position and being operative by pressure fluid supplied into the cavity in relation to movement of the rudder to new positions to move the member to corresponding changed positions, respectively;
means interconnecting the feed-back means and autopilot means for modifying the effect of the signal of the autopilot means in relation to the position to which the rudder has been moved; and
addition means including a throttling circuit continuously operable to by-pass fluid in said body from each side of the fluid pressure operable member to the other side thereof, and operable for biasing the feed-back means to its neutral condition and for causing the feed-back means to continuously approach said neutral condition at all times while the reversible power means is holding the rudder in a fixed position.

6. In an autopilot system for a dirigible vehicle steered by a rudder;
an autopilot for producing primary signals reflecting on-course and deviation from course;
reversible power means including a power transmission drivingly connected to the rudder and operable to drive the rudder in each of two opposite directions, selectively, to steering positions;
power transmitting feed-back means forming a power transmitting part of said power transmission means and being operative substantially instantly upon movement of the rudder for producing feed-back signals reflecting changes in rudder positions;
control means for controlling the reversible power means and operative in response to the resultant effect of the primary and feed-back signals for changing the rudder position; and
additional means connected to the feed-back means for continuously progressively reducing the effect of each feed-back signal on the control means independently of rudder position.

7. The structure according to claim 6 wherein the additional means include delay means for causing a time delay in said reduction of said effect of the feed-back signal.

8. A structure according to claim 6 wherein said feed-back means includes a part which is movable in opposite directions from a preselected neutral position to positions reflecting rudder positions, and is operative, during said movements, in the transmission of power to the rudder by the transmission;

and said additional means includes means to render said part self-restoring to said neutral position independently of rudder position.

9. A structure according to claim 8 wherein the transmission includes a first reversible piston and cylinder assemblage connected to the rudder, the feed-back means comprises a second reversible piston and cylinder assemblage connected in series with the first assemblage in a fluid pressure circuit, for driving the first assemblage by the second assemblage in one direction and for driving the second assemblage by the first assemblage in the opposite direction, said power transmitting part is the piston of the second assemblage, resilient biasing means bias the said piston to a centered neutral position, and throttling by-pass means by-pass fluid from each side of said piston to the other side of said piston so that said piston is restored to said centered position by the biasing means after a time delay.

10. A structure according to claim 6 wherein the autopilot includes a north-seeking member, a settable member movable with the vehicle in preselected set positions, respectively, relative to the vehicle, and signal producing means carried by the members and which produce said primary signals depending on the relative position of said members, means connect the settable member to said movable part for movement of the settable member thereby instantly out of set position to different positions relative to the vehicle in response to movements of said movable part and for restoration of the settable member to its preselected set position relative to the vehicle upon return of said movable part to its centered neutral position.

11. A structure according to claim 6 wherein said additional means is arranged for completely eliminating each feed-back signal produced by a change in rudder position upon the rudder remaining fixed in the last mentioned changed position for a substantial interval of time.

12. A feed-back signal device for a fluid pressure operated rudder drive device which includes a fluid pressure circuit and a movable member connected in the fluid pressure circuit for movement in opposite directions selectively in response to differentials in pressure in the circuit at opposite sides of the member and connected to the rudder for driving the same, said feed-back device comprising a hollow body having a cavity therein and two ports connected with the cavity; a power transmitting member mounted in the cavity between the ports for movement in opposite directions, respectively, by differentials in pressure of fluid on opposite sides of the member, resilient means biasing the power transmitting member to a neutral position, conduit means arranged to be connected in said circuit so as to connect the body, through said ports, in said circuit in series with the first mentioned device so that the movable members can move in unison with each other when the body is so connected, a throttling by-pass circuit connecting the body cavity at opposite sides of the power transmitting member for by-passing fluid from one side of the member to the other, and resilient means biasing said movable member to a neutral position within said body.

References Cited

UNITED STATES PATENTS

| | | | |
|---|---|---|---|
| 2,112,504 | 3/1938 | Mirfield | 114—144 |
| 2,188,834 | 1/1940 | Fischel et al. | 244—76 |
| 2,545,343 | 3/1951 | Conviser | 318—489 |
| 2,683,434 | 7/1954 | Weeks | 114—144 |
| 3,232,262 | 1/1966 | Janes et al. | 114—144 |
| 3,237,583 | 3/1966 | Johnson | 114—144 |

FOREIGN PATENTS 811,057   3/1959   Great Britain.

MILTON BUCHLER, *Primary Examiner.*

ANDREW H. FARRELL, *Examiner.*